US006958823B2

(12) United States Patent
Terasaka (10) Patent No.: US 6,958,823 B2
(45) Date of Patent: Oct. 25, 2005

(54) INTERNET FACSIMILE APPARATUS (75) Inventor: Teiji Terasaka, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 873 days.

(21) Appl. No.: 09/769,512

(22) Filed: Jan. 26, 2001

(65) Prior Publication Data

US 2002/0075512 A1 Jun. 20, 2002

(30) Foreign Application Priority Data

Jan. 28, 2000 (JP) .................................... P2000-020478

(51) Int. Cl.[7] .......................... G06K 1/00; H04N 1/32; G05B 15/00; H04M 1/00; H04M 3/00
(52) U.S. Cl. ...................... 358/1.15; 358/442; 700/83; 725/37; 379/368; 379/433.07
(58) Field of Search ................. 358/1.15, 442, 358/505; 379/368, 433.07, 915; 700/83; 710/36; 713/182; 341/20, 22; 705/18; 709/225

(56) References Cited

U.S. PATENT DOCUMENTS

| 4,870,503 | A | | 9/1989 | Miura |
|---|---|---|---|---|
| 5,881,233 | A | | 3/1999 | Toyoda et al. |
| 6,470,379 | B1 | | 10/2002 | Mori |
| 2001/0055127 | A1 | * | 12/2001 | Wakabayashi ............. 358/305 |
| 2003/0018730 | A1 | | 1/2003 | Mori |

FOREIGN PATENT DOCUMENTS

| JP | 6133089 | 5/1994 |
|---|---|---|
| JP | 8065479 | 3/1996 |
| JP | 8242326 | 9/1996 |
| JP | 9247334 | 9/1997 |
| JP | 10-171728 A | 6/1998 |
| JP | 11-196202 A | 7/1999 |
| JP | 11-234496 A | 8/1999 |
| JP | 11-306120 A | 11/1999 |
| JP | 2000-10884 A | 1/2000 |

* cited by examiner

*Primary Examiner*—Kimberly Williams
*Assistant Examiner*—Thomas J. Lett
(74) *Attorney, Agent, or Firm*—Birch, Stewart, Kolasch & Birch, LLP (57) ABSTRACT

An object of the invention is to provide an internet facsimile apparatus used by plural users, capable of reading out an electronic mail to each user by a simple operation. The internet facsimile apparatus includes, in an operation portion, a function key such as a mail transmission key, a mail confirmation key, a mail print key and a communication table key, a user key in correspondence to which personal data such as a mail address is registered, and an opposite side key, and processings can be carried out by performing a key entry in a combination of the keys. For example, when the mail print key, together with the user key, is pressed, an electronic mail reaching a mail address registered in correspondence to the user key is read out and image data is printed.

16 Claims, 9 Drawing Sheets

INTERNET FACSIMILE APPARATUS

BACKGROUND OF THE INVENTION

1. Field of the Invention

The present invention relates to a facsimile apparatus capable of transmitting and receiving a document through the Internet.

2. Description of the Related Art

A conventional technique relating to an internet facsimile apparatus, which converts image data readout by a scanner or the like into electronic mail data and transmits it as an electronic mail via the Internet, is disclosed in Japanese Unexamined Patent Publication JP-A 8-242326 (1996) and so on. There are roughly two electronic mail transmitting/receiving paths via the Internet, one is a path connected to the Internet via a public line and through a provider, and the other is a path connected to a LAN (Local Area Network) and connected to the Internet from a router through a mail server. In the internet facsimile apparatus, transmission/reception of an electronic mail can be made through both paths. Further, the internet facsimile apparatus can also perform normal facsimile communication via a public line in addition to the transmission/reception of an electronic mail via the Internet.

When image data is transmitted via the Internet, for example, a document is read out by a scanner, the read image data is once stored in a facsimile format, it is converted into electronic mail data of an electronic mail format when it is transmitted via the Internet, and is transmitted as an electronic mail. When the received electronic mail is printed, the electronic mail data of the electronic mail format is inversely converted into the image data of the facsimile format to be printed.

In the-internet facsimile apparatus disclosed in JP-A 8-242326, in the case where one or more users use this internet facsimile apparatus, in order to read out and print a received mail, it is necessary to input personal data such as an ID number and password of the user for the purpose of protecting personal privacy. Input of such data, which is usually carried out by means of a ten-keypad, character keys or the like, is troublesome and apt to cause an error.

Another conventional technique relating to an internet facsimile apparatus is disclosed in Japanese Unexamined Patent Publication JP-A 9-247334 (1997). Although the publication of JP-A 9-247334 discloses a method of providing one-touch keys which can register personal data of a user and an opposite side, it has such problems that the number of received mails for each user can not be confirmed.

SUMMARY OF THE INVENTION

An object of the present invention is to provide an internet facsimile apparatus capable of being used by one or more users and reading out a mail to each user by a simple operation.

The invention provides an internet facsimile apparatus which converts image data read out by a scanner into electronic mail data to transmit the electronic mail data as an electronic mail, comprising:

a user key in correspondence to which a mail address of each user is registered; and a function key including an image data output key which is pressed together with the user key to read out image data converted from electronic mail data of an electronic mail which was sent to the user's mail address.

According to the invention, since then mail which was sent to the mail address registered in correspondence to the user key can be read out and printed or displayed by pressing the image data output key together with the user key, a troublesome operation of inputting the user's mail address can be omitted and the apparatus can be simply operated.

Further, in the invention it is preferable that the function key includes a mail transmission key for setting the mail address registered in correspondence to the user key, to the electronic mail and transmitting the same, by being pressed together with the user key.

According to the invention, the mail address registered in correspondence to the user key can be set to the electronic mail and it can be transmitted by pressing the mail transmission key together with the user key, so that a troublesome operation of inputting the user's mail address can be omitted and the apparatus can be simply operated.

Further, in the invention it is preferable that the function key includes a mail confirmation key for displaying the number of mails reaching the mail address registered in correspondence to the user key which has been pressed together with the mail function key.

According to the invention, the number of mails reaching the mail address registered in correspondence to the user key can be confirmed by pressing the mail confirmation key together with the user key.

Thus, the user can easily know the reception of the mail, and can certainly read out the received mail.

Further, in the invention it is preferable that the function key includes a mail confirmation key for displaying number of mails reaching each user by pressing the same.

According to the invention, the number of mails reaching each user can be confirmed by pressing the mail confirmation key.

Thus, the user can easily know the reception of a mail, and can certainly read out the received mail. Further, the user can confirm the number of mails reaching another person and can inform the person of the number.

Further, in the invention it is preferable that in correspondence to each user key, signature data of the corresponding user is registered, and when the user key is pressed at the time of transmission of an electronic mail, the electronic mail is transmitted after the signature data registered in correspondence to the user key is added to the electronic mail data.

According to the invention, since the signature data of the user can be added to the transmitted mail by pressing the user key to which the signature data is registered in correspondence, it is possible to inform a reception side of information such as a name of a transmitter by a simple operation.

Further, in the invention it is preferable that an intrinsic pass code is registered in correspondence to each user key, and only in the case where a pass code which is inputted along with pressing the user key coincides with the pass code registered in correspondence to the user key, readout of the electronic mail reaching the mail address is enabled.

According to the invention, readout of the received electronic mail by another person can be prevented by registering the pass code in correspondence to the user key, and personal privacy can be protected.

Further, in the invention it is preferable that only in the case where a pass code which is inputted along with pressing the user key coincides with the pass code registered in correspondence to the user key, transmission of the electronic mail is enabled.

According to the invention, by registering the pass code in correspondence to the user key, it is possible to prevent a wrong mail address from being set to the electronic mail to be transmitted, and to prevent a wrong signature data from being added to the electronic mail data to be transmitted.

Further, in the invention it is preferable that the internet facsimile apparatus comprises a function for periodically displaying number of electronic mails reaching each user.

Since the internet facsimile apparatus according to the invention periodically displays the number of electronic mails reaching each user, the user can confirm the number of electronic mails reaching the user even if the user does not press the mail confirmation key. Thus, the user can periodically know the number of received electronic mails, and can certainly read out the received electronic mails.

Further, in the invention it is preferable that the internet facsimile apparatus comprises a function for storing a combination of a pressed user key and a pressed function key and thereby preparing a communication table indicating communication information for each user.

According to the invention, since it is possible to know through the pressed function key and user key who performed each processing, the communication table indicating the communication contents such as a date and time of transmission/reception can be prepared for each user.

Thus, the user can know the communication information such as a date and time of transmission/reception.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
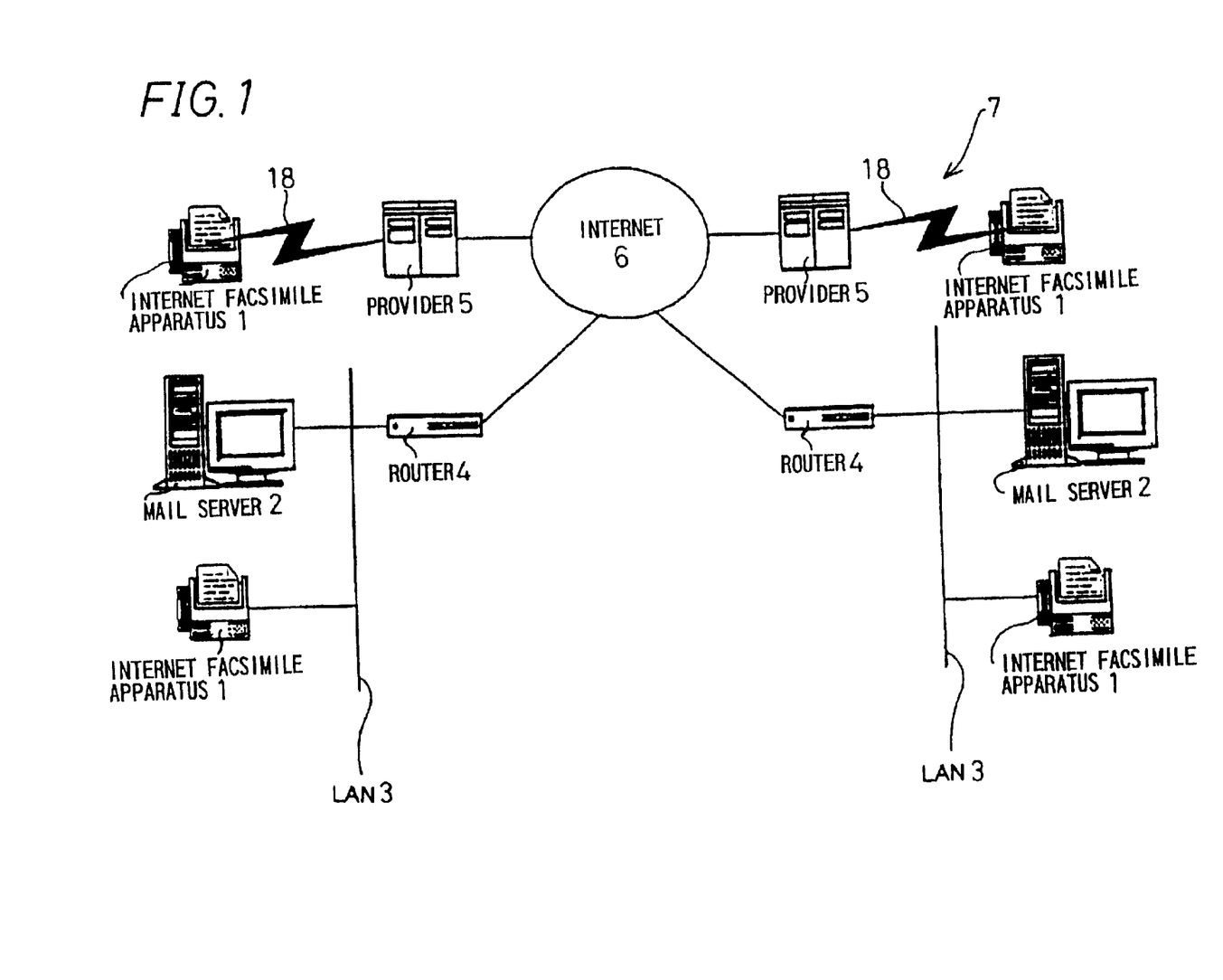
FIG. 1 is a schematic structural view of an internet system 7 of an internet facsimile apparatus 1 of an embodiment of the invention.

FIG. 1 is a schematic structural view of an internet system 7 of an internet facsimile apparatus 1 of an embodiment of the invention. There are roughly two electronic mail transmitting/receiving paths via the Internet, one is a path connected to the Internet 6 via a public line 18 and through a provider, and the other is a path connected to a LAN (Local Area Network) 3 and connected to the Internet 6 from a router 4 through a mail server 2. In the internet facsimile apparatus 1, transmission/reception of an electronic mail can be made through both the paths. Further, the internet facsimile apparatus 1 can also perform normal facsimile communication via the public line 18 in addition to the transmission/reception of an electronic mail via the Internet 6.

Figure 2:
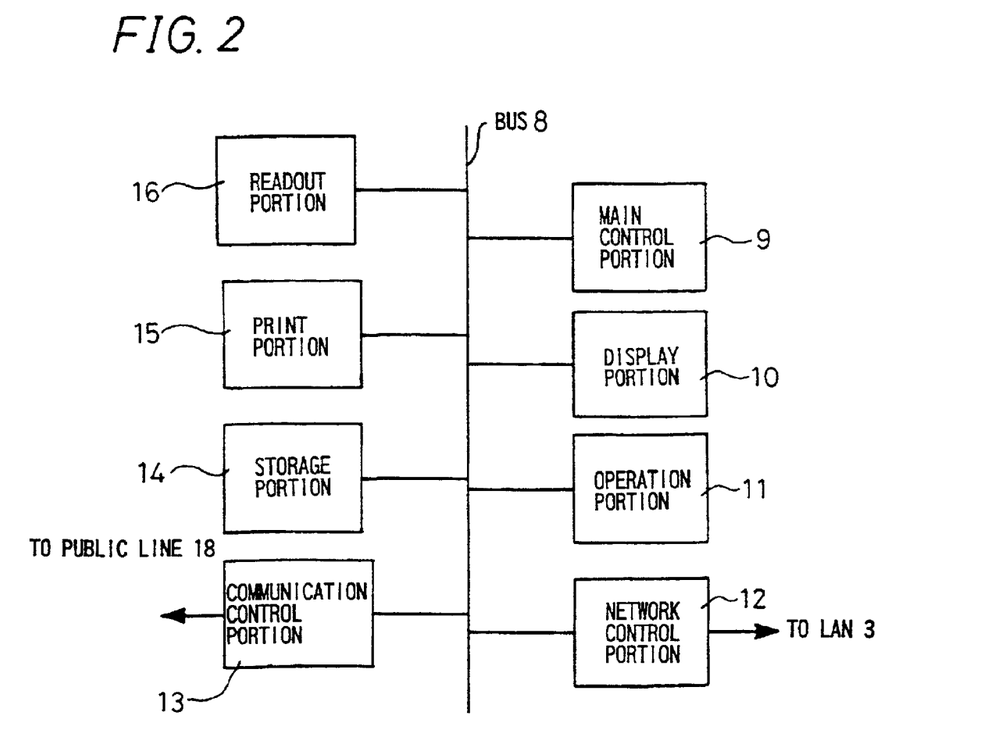
FIG. 2 is a schematic block diagram of the internet facsimile apparatus 1.

FIG. 2 is a schematic block diagram of the internet facsimile apparatus 1. The internet facsimile apparatus 1 includes a main control portion 9 for controlling the apparatus, a display portion 10 for performing predetermined display, an operation portion 11 necessary for a user to operate the internet facsimile apparatus 1, a network control portion 12 for controlling connection to the LAN 3, a communication control portion 13 for controlling connection to the public line 18, a storage portion 14 for storing a startup program and the like, a print portion 15 for printing received data, a readout portion 16, such as a scanner, for reading out a document, and a bus 8 for connecting these.

In the internet facsimile apparatus 1, when an electronic mail is transmitted, for example, a document is read out by the readout portion 16, the read image data in a facsimile format is stored, the data is converted into an electronic mail format when it is transmitted via the Internet 6, and it is transmitted as the electronic mail. When a received electronic mail is printed, the received electronic mail is inversely converted into image data of the facsimile format from the electronic mail format, and the image data is printed by the print portion 15.

Figure 3:
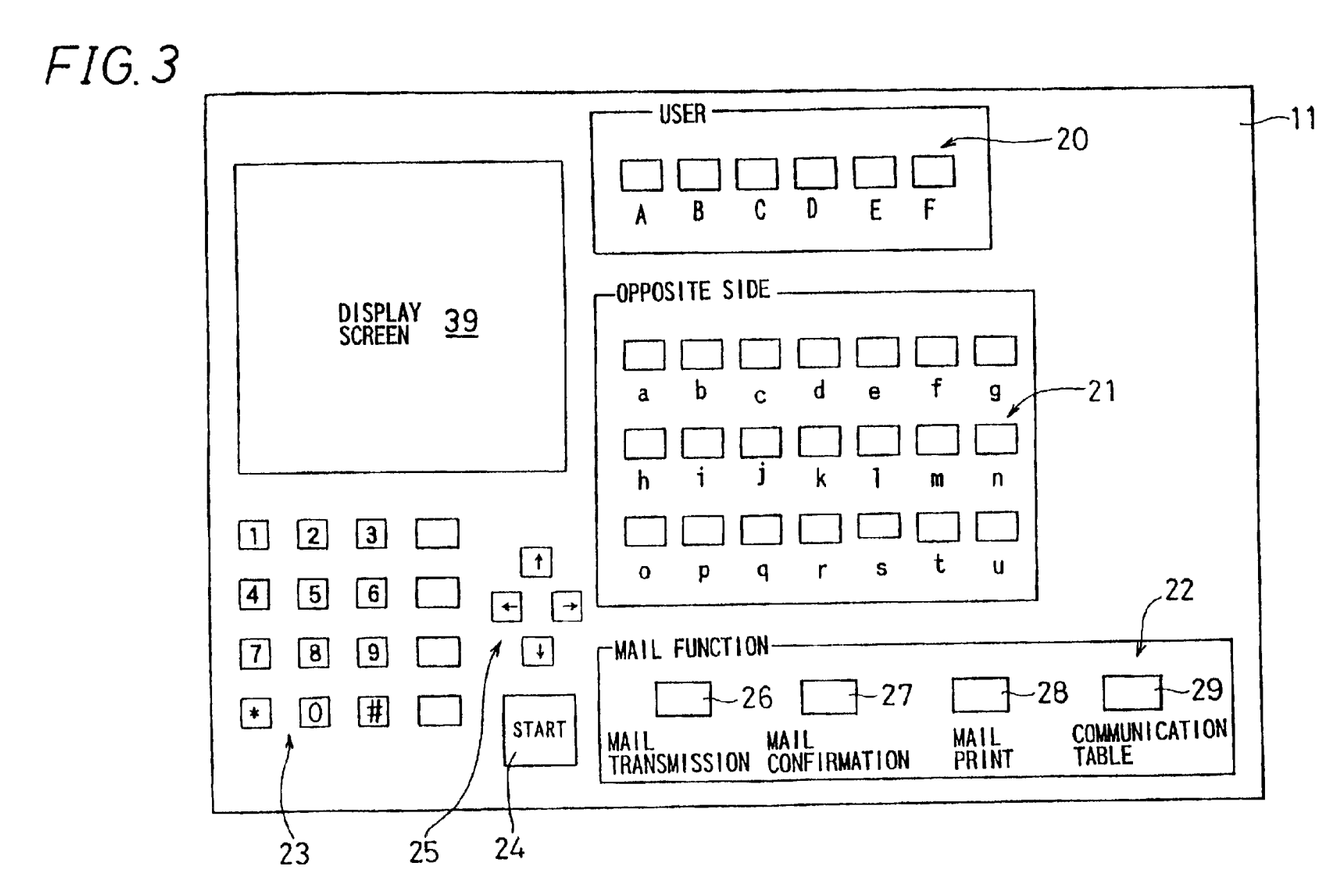
FIG. 3 is a view showing an operation portion 11 and a display screen 39 of a display portion 10 of the internet facsimile apparatus 1.

FIG. 3 is a view showing the operation portion 11 and a display screen 39 of the display portion 10 of the internet facsimile apparatus 1. The operation portion 11 includes a user key 20, an opposite side key 21, a function key 22, a ten-key keypad 23, a start key 24, and a cursor key 25.

The user key 20 includes, for example, six one-touch keys of the English alphabet letters of A to F, and personal data of each user can be registered in each of the one-touch keys. The opposite side key 21 includes, for example, twenty-one one-touch keys of the English alphabet letters of a to u, and personal data, such as FAX number and mail address, of each opposite side can be registered in each of the one-touch keys.

Although a dedicated key may be provided as the user key 20 for registering the personal data of each user, since most facsimile apparatuses are provided with several to several hundred one-touch keys for dialing an opposite side by one touch, the personal data of each user may be registered in this one-touch key and the one-touch key may be made to function as the user key 20.

The function key 22 includes a mail transmission key 26, a mail confirmation key 27, a mail print key 28, and a communication table key 29.

The mail transmission key 26 is structured such that when it is pressed together with the opposite side key 21 and the user key 20 at the time of transmission of an electronic mail, mail transmission processing can be executed in which read image data is converted into electronic mail data and is transmitted as an attached file of the electronic mail.

The mail confirmation key 27 is structured such that when it is pressed together with the user key 20, mail confirmation processing in which the number of electronic mails reaching the mail address registered in this user key 20 is displayed on the display screen 39 of the display portion 10 can be performed. Incidentally, the number of electronic mails reaching the respective users may be displayed together by pressing only the mail confirmation key 27.

The mail print key 28 is structured such that when it is pressed together with the user key 20, electronic mail print processing in which the electronic mail reaching the mail address registered in this user key 20 is printed can be performed.

The communication table key 29 is structured such that when it is pressed, communication table print processing in which a communication table described later in detail is printed for each user can be performed.

As described above, each of the keys 26 to 29 of the function key 22 corresponds to each processing, and when it is pressed together with the user key 20 or the opposite side key 21, each processing is performed.

Table 1 is a one-touch key register table showing personal data registered in correspondence to the user key 20 and the opposite side key 21.

possible to prevent the received electronic mail of another person from being read out and to prevent the personal data of another person from being added to the electronic mail and being transmitted.

In the region of the signature data, information of the user added to the electronic mail data at the time of electronic mail transmission is registered. In the Internet, for the purpose of clarifying a transmitter of an electronic mail, there is a habit of entering the name, group the transmitter belongs to, or the like in the text of the electronic mail. Thus, as the need arises, such information is registered in the signature data.

In the region of the function, a function, such as transmission or reception, which the one-touch key can use is registered. In the internet facsimile apparatus 1, an English alphabet key corresponds to each function, for example, the transmission is A, the reception is C, and the signature is B, and it can be registered by input of the English alphabet key.

TABLE 1

| One-touch key | Name | ID | FAX number | Mail address | Pass code | Signature data | Function |
|---|---|---|---|---|---|---|---|
| 1 | AAA | 0000100 | 061112222 | aaa@bb.co.jp |  | — | AB |
| 2 | BBBB | 0123456 | 0301234567 | ccc@dd.co.jp |  |  | A |
| 3 | C | 1111111 |  |  | ***** |  | C |
| . | . | . | . | . | . | . | . |
| . | . | . | . | . | . | . | . |
| . | . | . | . | . | . | . | . |

In the internet facsimile apparatus 1, an area where the personal data such as name, ID, FAX number, mail address, pass code, signature data, and function can be stored is provided in a nonvolatile memory of the storage portion 14, and the personal data of each person can be registered in each of the one-touch keys of the user key 20 and the opposite side key 21 by performing key input through the operation portion 11 while confirmation is made through the display screen 39 of the display portion 10. The personal data of each person is made to correspond to the number of the one-touch key and is registered in the one-touch key table. As the personal data, among the name, ID, FAX number, mail address, pass code, signature data, and function, what is necessitated for the one-touch key is registered.

In the region of the name, the name of the opposite side is registered in case of the one-touch key of the opposite side key 21, and the name of the user is registered in case of the one-touch key of the user key 20.

The identification code of the user is registered in the region of the ID.

The FAX number of the opposite side to which FAX transmission is made is registered in the region of the FAX number.

In the region of the mail address, the mail address of the opposite side to which the electronic mail is transmitted is registered in case of the one-touch key of the opposite side key 21, and the mail address of the user is registered in case of the one-touch key of the user key 20.

In the region of the pass code, in the one-touch key of the user key 20, a pass code is registered to secure the security of the user key 20. Only in a case where a pass code inputted together with the operation of the user key 20 coincides with the registered pass code, transmission of the electronic mail and readout of the received electronic mail can be made, so that when the pass code is registered for each user, it is In the internet facsimile apparatus 1, the one-touch keys 20, 21 and the function key 22 like this are provided, so that the key input operation of the user becomes easy.

Figure 4:
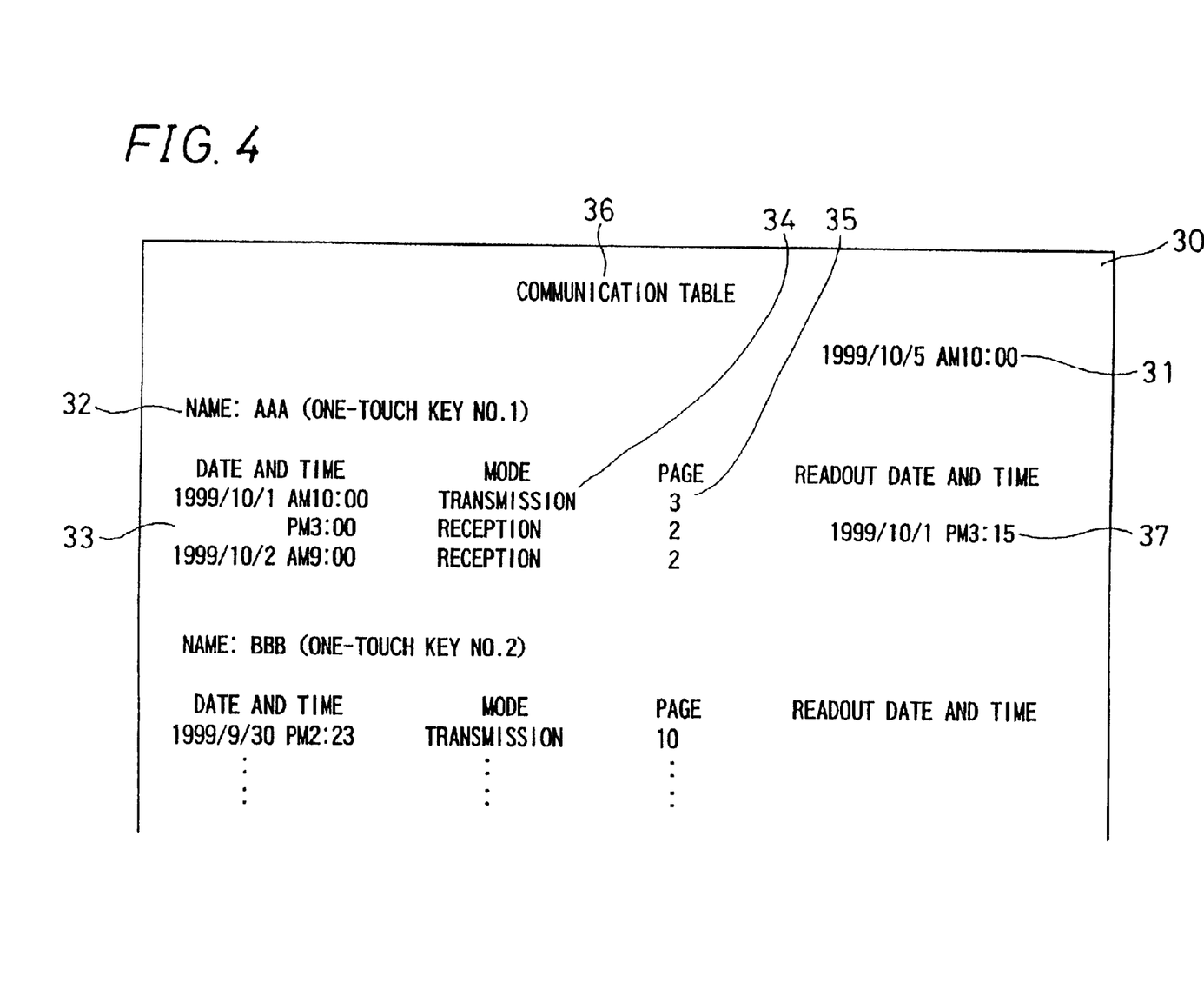
FIG. 4 is a view showing the contents of a printed communication table 30.

Next, the communication table printed by pressing the communication table key 29 will be described. FIG. 4 is a view showing the contents of the printed communication table 30. In the internet facsimile apparatus 1, since the user can be known by the user key 20 pressed in each processing, input information of the function key 22 and the one-touch keys 20 and 21 is stored as communication information in the storage portion 14, and the communication table 30 for each user can be prepared on the basis of the stored communication information.

In the communication table 30, first, a document name 36 as communication table and a date and time 31 when the communication table is printed are entered at a first line, a name 32 of a user registered in a one-touch key No. 1 of the user key 21 is entered at a next line, and further, communication information, such as a date and time 33 of transmission/reception, a mode 34 indicating either transmission or reception, a page number 35 of transmission/reception data, and a readout date and time 37 when the data is reception data, is sequentially recorded from old information. Further, at the lower lines, communication information of users of a one-touch key No. 2 and the subsequent keys of the user key 21 is recorded for each user and in the order of the number of the one-touch key register table.

Figure 5:
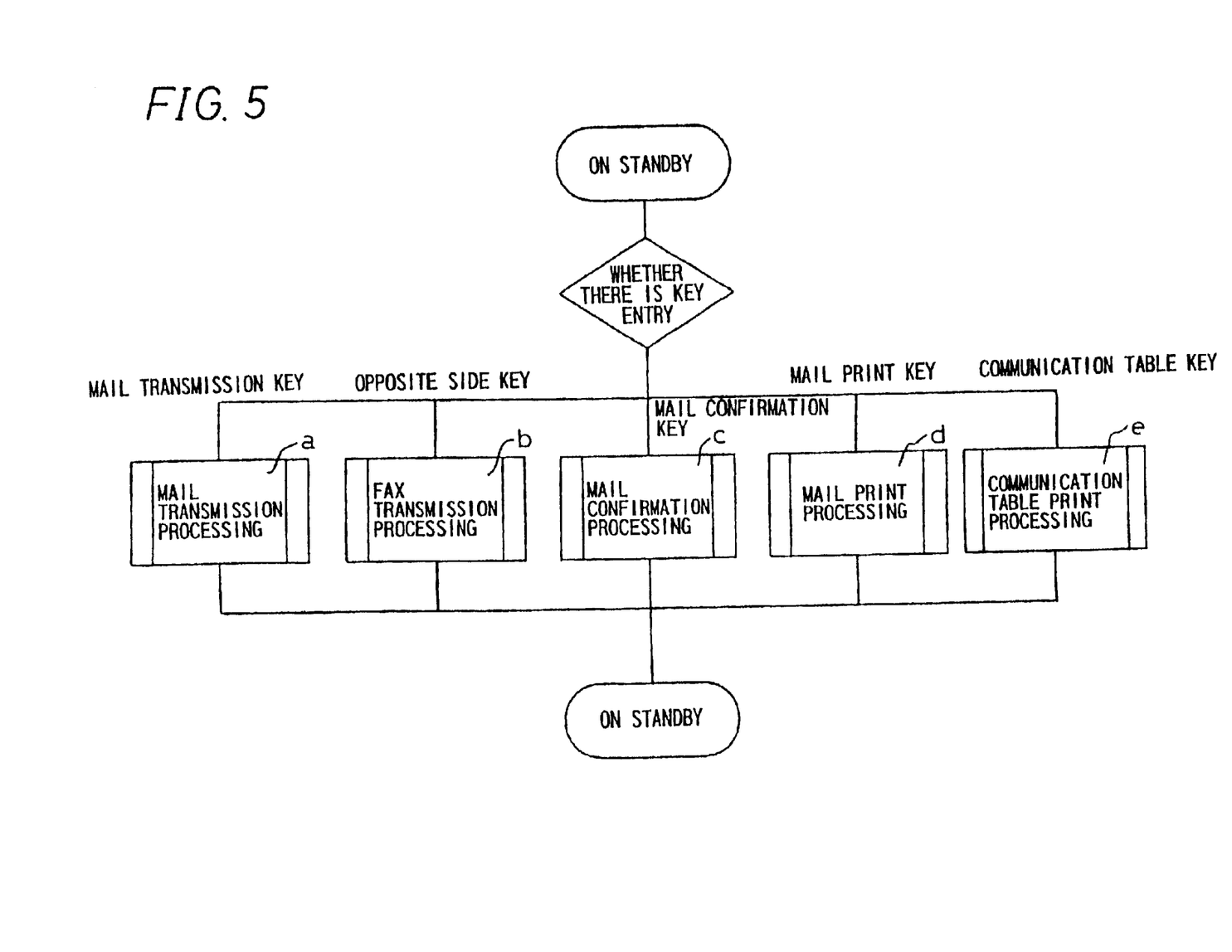
FIG. 5 is a flowchart showing each processing of the internet facsimile apparatus 1.

FIG. 5 is a flowchart showing each processing of the internet facsimile apparatus 1. In the internet facsimile apparatus 1 in which data of respective persons is registered in the one-touch keys 20 and 21, a processing operation is determined by a key pressed in a standby state. When the mail transmission key 26 is pressed in the standby state, it enters into a mail transmission mode of step a in which electronic mail transmission processing is performed, when the opposite side key 21 is pressed, it enters into a FAX transmission mode of step b in which FAX transmission processing is performed, when the mail confirmation key 27 is pressed, it enters into a mail confirmation mode of step c in which mail confirmation processing is performed, when the mail print key 28 is pressed, it enters into a mail print mode of step d in which mail print processing is performed, and when the communication table key 29 is pressed, it enters into a communication table print mode of step e in which communication table print processing is performed. The internet facsimile apparatus 1 returns to the standby state when each processing is completed. Hereinafter, each processing at the steps a to e will be described in detail.

Figure 6:
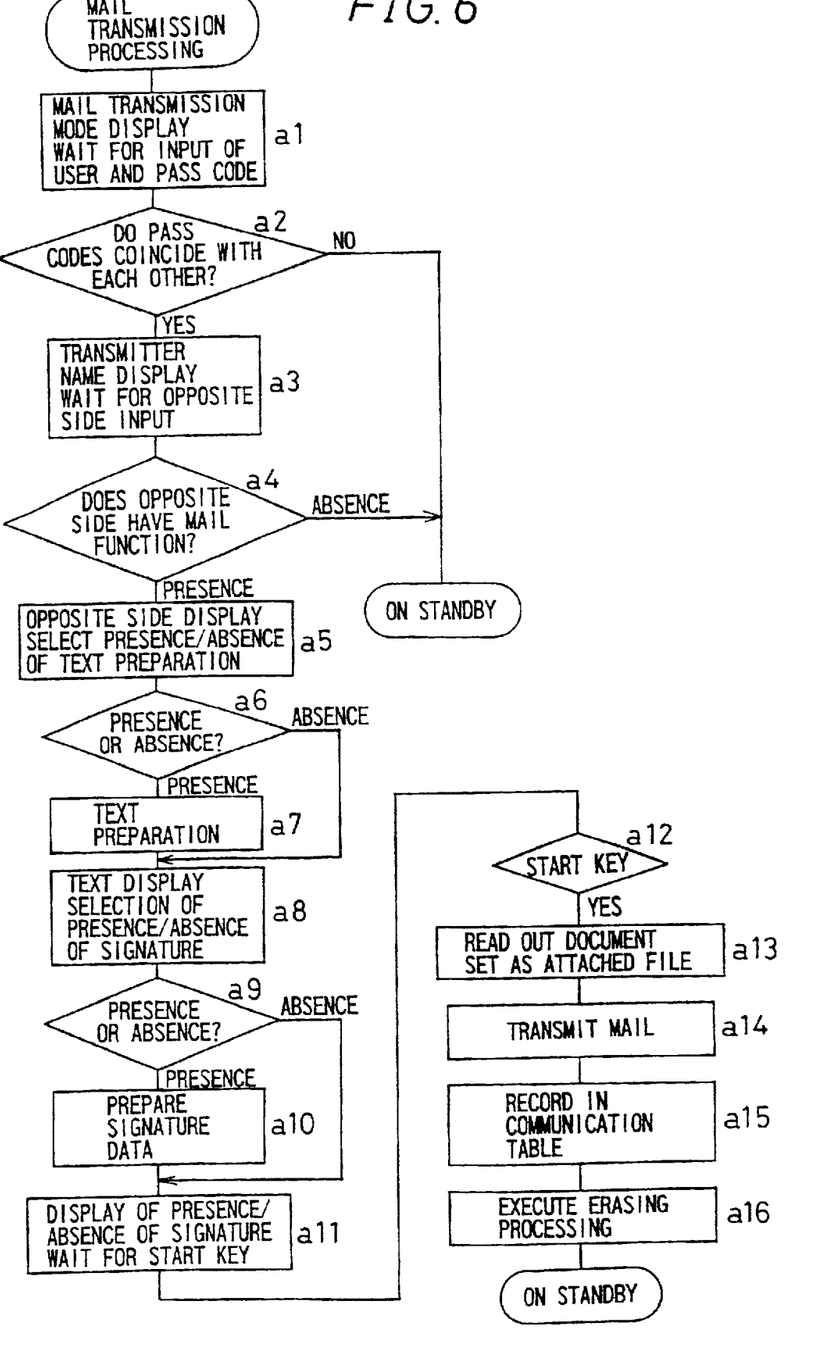
FIG. 6 is a flowchart showing electronic mail transmission processing.

FIG. 6 is a flowchart showing the electronic mail transmission processing. At step a1, when the mail transmission key 26 is pressed in the standby state, the mail transmission mode starts and it becomes an input waiting state for the user key 20 and the pass code of the user.

At step a2, when the user key 20 is pressed and the pass code is inputted by the user, the one-touch key registration table shown in Table 1 is searched, and it is judged whether the inputted pass code coincides with the pass code registered in this user key 20. When this judgement is Yes, the name registered in this user key 20 is displayed on the display screen 39 at step a3, the mail address registered in correspondence to the user key 20 is set to the electronic mail to be transmitted, and the state becomes an input waiting state for the opposite side key 21. On the other hand, when the judgement is No, it returns to the standby state.

At step a4, when the opposite side key 21 is pressed, the one-touch key register table shown in Table 1 is searched, and it is judged whether the mail address and mail transmission function are registered in this opposite side key 21. When this judgement indicates that the mail transmission function is registered in the opposite side key 21, the name of the opposite side is displayed on the display screen 39 at step a5, the mail address registered in this opposite side key 21 is set to the electronic mail to be transmitted, and the user is requested to select whether the text is prepared. Here, the text is not image data to be attached, but sentence data with characters.

Next, at step a6, the user selects the presence or absence of the text. Here, when the presence is selected, at step a7, the text previously prepared is inputted to the electronic mail to be transmitted. Incidentally, the text may be newly prepared by the operation portion 11. On the other hand, when the absence is selected, the text is not inputted to the electronic mail to be transmitted.

At step a8, when the text exists, the text is displayed on the display screen 39, and the user is requested to select whether signature data is added to the text of the electronic mail.

At step a9, the user selects the presence or absence of the signature data. Here, when the presence is selected, at step a10, the signature data registered in the one-touch key registration table is added to the last of the text. On the other hand, when the absence is selected, the signature data is not inputted to the electronic mail to be transmitted.

At step a11, the contents of the text and the signature data are displayed on the display screen 39, and the state becomes an input waiting state for the START key 24. At step a12, it is judged whether the START key 24 is inputted. When this judgement is Yes, at step a13, a document set to the readout portion 16 is read out, the read image data is converted into electronic mail data, and is set, as an attached file, to the electronic mail to be transmitted.

At step a14, the electronic mail to which the attached file is set is transmitted, and after the communication information such as a transmission date and time is stored in the storage portion 14 at step a15, the transmitted electronic mail is erased at step a16, and the mail transmission processing is completed.

Figure 7:
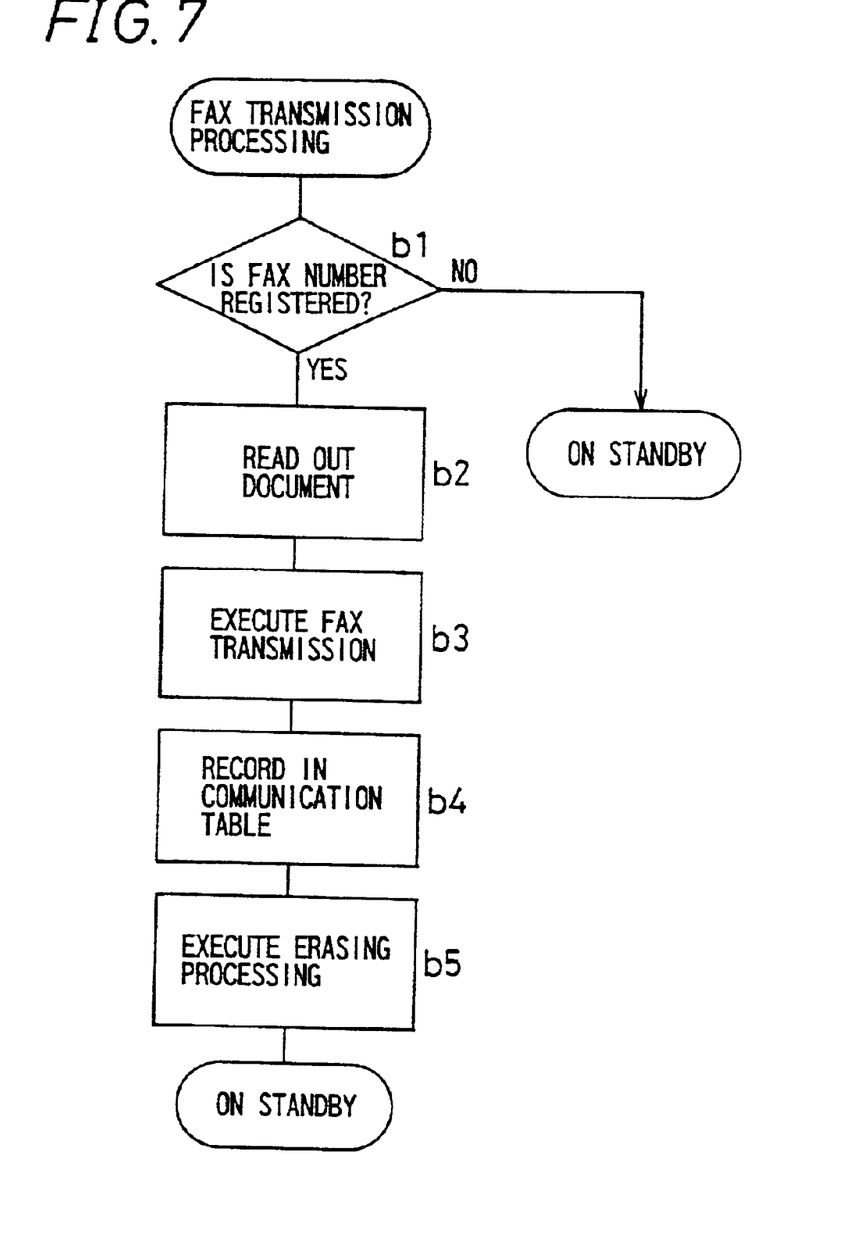
FIG. 7 is a flowchart showing FAX transmission processing.

FIG. 7 is a flowchart showing the FAX transmission processing. At step b1, when the opposite side key 21 is pressed in the standby state, a FAX transmission mode starts. At step b2, the one-touch key registration table is searched, and it is judged whether the FAX number is registered in this opposite side key 21. When this judgement is Yes, the document set to the readout portion 16 is read out. On the other hand, when the judgement is No, it returns to the standby state.

At step b3, the read image data is converted into facsimile data, and FAX communication is performed to the FAX number registered in the opposite side key 21. At step b4, after the communication information is stored in the storage portion 14, transmission data is erased at step b5, and the FAX transmission is completed.

Figure 8:
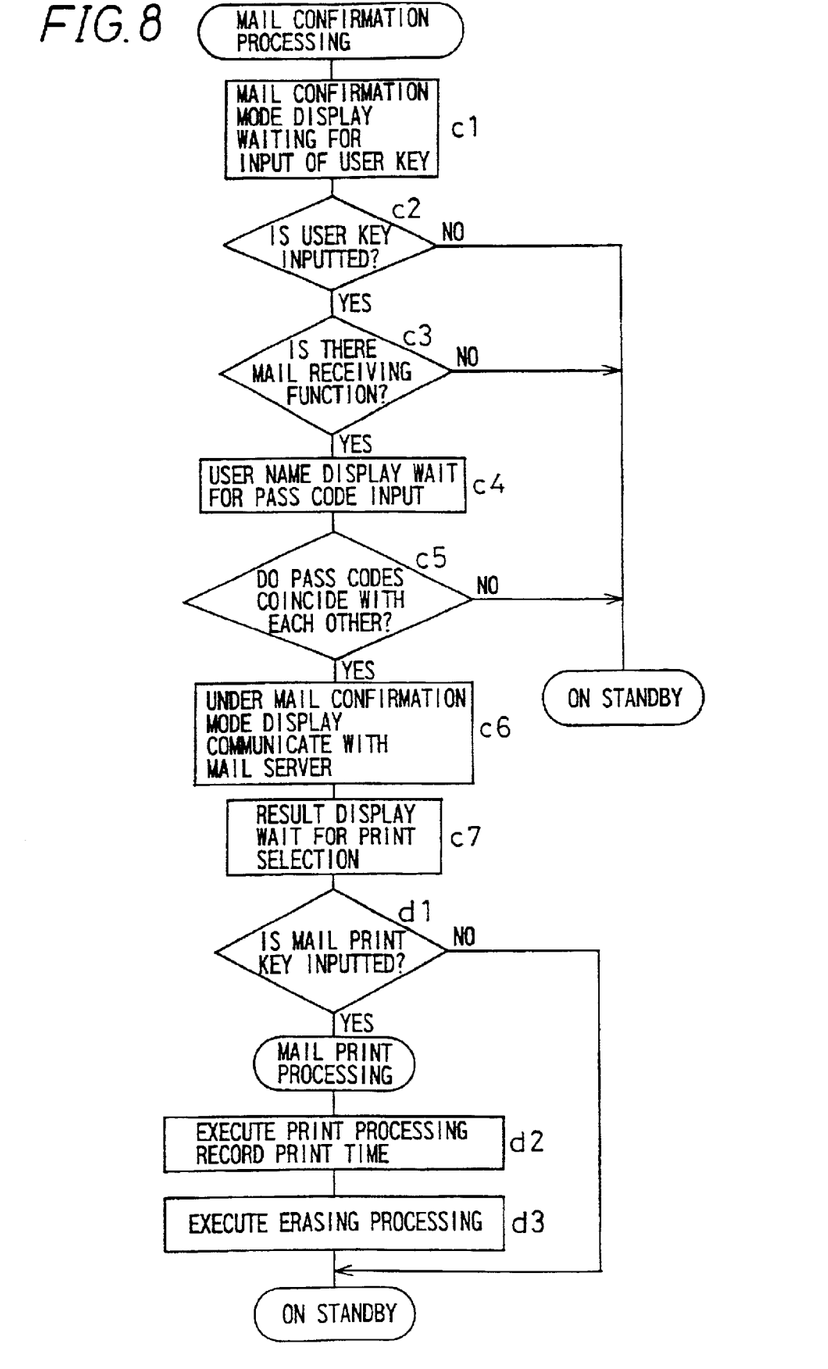
FIG. 8 is a flowchart showing electronic mail confirmation processing.

FIG. 8 is a flowchart showing the mail confirmation processing. At step c1, when the mail confirmation key 27 is pressed in the standby state, a mail confirmation mode starts, and it becomes an input waiting state for the user key 20.

At step c2, it is judged whether the user key 20 is pressed. When this judgement is Yes, the one-touch key registration table shown in Table 1 is searched at step c3, and it is judged whether the mail reception function is registered in correspondence to the user key 20. On the other hand, the judgement is No, it returns to the standby state.

When the mail reception function is registered in correspondence to the user key 20 at the judgement of step c3, at step c4, the name registered in correspondence to the user key 20 is displayed on the display screen 39, and the state becomes an input waiting state for the pass code. On the other hand, when it is not registered, the state returns to the standby state.

Next, when the pass code is inputted by the user, at step c5, the one-touch key registration table shown in Table 1 is searched, and it is judged whether the inputted pass code coincides with the registered pass code. When this judgement is Yes, under mail confirmation is displayed on the display screen 39 at step c6, communication with the mail server is performed, and it is confirmed whether an electronic mail reaches the mail address registered in this user key 20. On the other hand, when the judgement is No, it returns to the standby state.

At step c7, the number of mails reaching the mail address registered in this user key 20 is displayed on the display screen 39, the mail confirmation processing is completed, and subsequently, the state becomes an input waiting state for the mail print key 28.

At step d1, it is judged whether the mail print key 28 is pressed by the user. When this judgement is Yes, the mail print processing mode starts. On the other hand, when the judgement is No, it returns to the standby state, and the received electronic mail is stored in the storage portion 14.

At step d2, the confirmed electronic mail is read out, is inversely converted into image data, and is printed. When printing is normally ended, the communication information such as a print time is stored in the storage portion 14, the electronic mail printed at step d3 is erased, and the mail print processing is completed.

Incidentally, in the above description, although the mail print processing is performed subsequently to the mail confirmation processing, in the case where the mail print key 28 is pressed in the standby state, the mail print processing mode directly starts, and the input of the user key 20 and the pass code is requested, so that the received mail is not read out by another person and the privacy of the user can be protected.

Further, the confirmation of the received mail may be set such that communication with the mail server is periodically performed, and the name of each user and the number of mails reaching each user are displayed on the display screen 39 in the standby state. When such setting is made, even if the mail confirmation key 27 is not pressed, the number of received mails can be confirmed.

Figure 9:
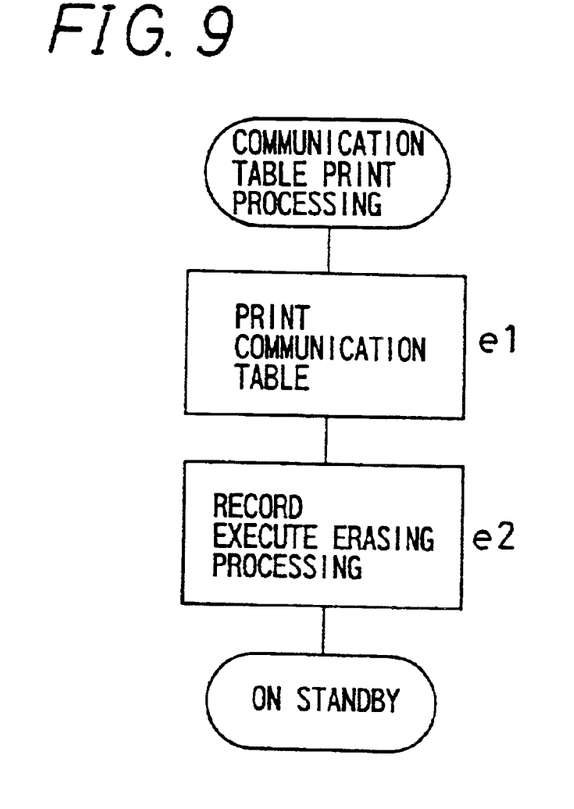
FIG. 9 is a flowchart showing print processing of the communication table 30.

FIG. 9 is a flowchart showing the print processing of the communication table 30. At step e1, when the communication table key 29 is pressed in the standby state, the communication table print processing mode starts, and on the basis of the communication information stored in the storage portion 14, the communication table 30 as shown in FIG. 4 is printed. At step e2, when printing of the communication table 30 is ended, the communication information of the storage portion 14 is erased, and the communication table print processing is completed. As described above, in the internet facsimile apparatus 1, each processing can be simply performed by combining and pressing the function key 22, the user key 20, and the opposite side key 21.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An internet facsimile apparatus which converts image data read out by a scanner into electronic mail data to transmit the electronic mail data as an electronic mail, comprising:
   a user key in correspondence to which a mail address of each user is registered; and
   a function key panel including mail function keys for image data output which includes pressing at least one of the mail function keys together with the user key to read out the image data converted from electronic mail data of the electronic mail which was sent to the user's mail address.

2. The internet facsimile apparatus of claim 1, wherein one of the mail function keys includes a mail transmission key for setting the mail address registered in correspondence to the user key to the electronic mail and transmitting the electronic mail, by pressing together the mail transmission key with the user key.

3. The internet facsimile apparatus of claim 1, wherein one of the mail function keys includes a mail confirmation key for displaying a number of mail reaching the mail address registered in correspondence to the user key which has been pressed together with the mail function key.

4. The internet facsimile apparatus of claim 2, wherein one of the mail function keys includes a mail confirmation key for displaying a number of mail reaching the mail address registered in correspondence to the user key which has been pressed together with the mail function key.

5. The internet facsimile apparatus of claim 1, wherein one of the mail function keys includes a mail confirmation key for displaying a number of mail reaching each user by pressing the the mail confirmation key.

6. The internet facsimile apparatus of claim 2, wherein one of the function keys includes a mail confirmation key for displaying a number of mail reaching each user by pressing the the mail confirmation key.

7. The internet facsimile apparatus of claim 1, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

8. The internet facsimile apparatus of claim 2, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

9. The internet facsimile apparatus of claim 3, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

10. The internet facsimile apparatus of claim 4, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

11. The internet facsimile apparatus of claim 5, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

12. The internet facsimile apparatus of claim 6, wherein in correspondence to each user key, signature data of the corresponding user is registered, and when the user key is pressed at a time of transmission of an electronic mail, the electronic mail is transmitted after the signature data registered in correspondence to the user key is added to the electronic mail data.

13. The internet facsimile apparatus of claim 1, wherein an intrinsic pass code is registered in correspondence to each user key, and only in the case where a pass code which is inputted along with pressing the user key coincides with the pass code registered in correspondence to the user key, readout of the electronic mail reaching the mail address is enabled.

14. The internet facsimile apparatus of claim 13, wherein only in the case where a pass code which is inputted along with pressing the user key coincides with the pass code registered in correspondence to the user key, transmission of the electronic mail is enabled.

15. The internet facsimile apparatus of claim 1, further comprising:
   a function for periodically displaying a number of electronic mail reaching each user.

16. The internet facsimile apparatus of claim 1, further comprising:
   a function for storing a combination of a pressed user key and a pressed mail function key and thereby preparing a communication table indicating communication information for each user.

* * * * *